United States Patent
Torfs et al.

(10) Patent No.: US 11,667,564 B2
(45) Date of Patent: Jun. 6, 2023

(54) METHOD OF MANUFACTURING AN ETCHED GLASS ARTICLE

(71) Applicant: AGFA-GEVAERT NV, Mortsel (BE)

(72) Inventors: Rita Torfs, Mortsel (BE); Frank Louwet, Mortsel (BE); Johan Loccufier, Mortsel (BE); Mark Lens, Mortsel (BE)

(73) Assignee: AGFA-Gevaert NV, Mortsel (BE)

( * ) Notice: Subject to any disclaimer, the term of this patent is extended or adjusted under 35 U.S.C. 154(b) by 1318 days.

(21) Appl. No.: 16/080,400

(22) PCT Filed: Feb. 24, 2017

(86) PCT No.: PCT/EP2017/054308
§ 371 (c)(1),
(2) Date: Aug. 28, 2018

(87) PCT Pub. No.: WO2017/148812
PCT Pub. Date: Sep. 8, 2017

(65) Prior Publication Data
US 2021/0017068 A1    Jan. 21, 2021

(30) Foreign Application Priority Data
Feb. 29, 2016 (EP) .................................... 16157788

(51) Int. Cl.
*C03C 15/00* (2006.01)
*C03C 17/28* (2006.01)

(52) U.S. Cl.
CPC .............. *C03C 15/00* (2013.01); *C03C 17/28* (2013.01); *C03C 2218/119* (2013.01); *C03C 2218/34* (2013.01)

(58) Field of Classification Search
None
See application file for complete search history.

(56) References Cited

U.S. PATENT DOCUMENTS

| | | | |
|---|---|---|---|
| 6,849,308 B1 * | 2/2005 | Speakman | G03F 7/16 427/422 |
| 10,793,468 B2 * | 10/2020 | Torfs | C09D 11/101 |
| 2008/0233307 A1 | 9/2008 | Satou et al. | |

(Continued)

FOREIGN PATENT DOCUMENTS

| | | |
|---|---|---|
| WO | 01/11426 A1 | 2/2001 |
| WO | 2004/106437 A1 | 12/2004 |

(Continued)

OTHER PUBLICATIONS

Official Communication issued in International Patent Application No. PCT/EP2017/054308, dated May 4, 2017.

(Continued)

*Primary Examiner* — Michael P. Rodriguez
(74) *Attorney, Agent, or Firm* — Leydig, Voit & Mayer, Ltd.

(57) ABSTRACT

A method of manufacturing an etched glass article including the steps of jetting an image with a UV curable inkjet ink on a surface of the glass article; curing the image; etching the surface not covered by the UV cured image to obtain an etched image; and solubilising the UV cured image in an aqueous alkaline solution.

17 Claims, 2 Drawing Sheets

(56) References Cited

U.S. PATENT DOCUMENTS

| | | | | |
|---|---|---|---|---|
| 2012/0283349 A1* | 11/2012 | Loccufier | ................ | G03F 7/027 |
| | | | | 522/14 |
| 2014/0045966 A1* | 2/2014 | Motofuji | ............ | C08G 18/6705 |
| | | | | 522/183 |
| 2015/0191391 A1* | 7/2015 | Sinapi | .................... | C03C 15/00 |
| | | | | 428/156 |

FOREIGN PATENT DOCUMENTS

| | | | | |
|---|---|---|---|---|
| WO | 2006/087320 A1 | 8/2006 | | |
| WO | 2009/083468 A1 | 7/2009 | | |
| WO | 2013/189762 A1 | 12/2013 | | |
| WO | WO-2013189762 A1 * | 12/2013 | ............. | C03C 15/00 |
| WO | 2015/132020 A1 | 9/2015 | | |

OTHER PUBLICATIONS

Torfs et al., "Method of Manufacturing an Etched Glass Article,", U.S. Appl. No. 16/080,405, filed Aug. 28, 2018.

Torfs et al., "Method of Manufacturing an Etched Glass Article,", U.S. Appl. No. 16/080,411, filed Aug. 28, 2018.

\* cited by examiner

METHOD OF MANUFACTURING AN ETCHED GLASS ARTICLE

CROSS REFERENCE TO RELATED APPLICATIONS

This application is a 371 National Stage Application of PCT/EP2017/054308, filed Feb. 24, 2017. This application claims the benefit of European Application No. 16157788.7, filed Feb. 29, 2016, which is incorporated by reference herein in its entirety.

BACKGROUND OF THE INVENTION

1. Field of the Invention

The present invention relates to selective etching of glass, for example for decorative purposes, more specifically to etching of glass using inkjet technology.

2. Description of the Related Art

A preferred selective chemical etching method to obtain a specific pattern on the surface of a glass article uses a protective mask, which is resistant to the etching treatment, making it possible to expose only certain parts of the surface of the glass to the etching treatment. The protective mask is then removed after the etching treatment. The obtained etched pattern is thus the negative of the protective mask applied beforehand.

WO2006/087320 (GLAVERBEL) and WO2009/083468 (AGC) disclose a method to selectively etch a glass surface wherein a protective layer composed of a low-temperature melting wax is deposited by screen printing, by a hot applicator or by inkjet technology on the glass surface.

The deposition of a wax by inkjet printing requires heating the printheads at temperatures high enough to melt the wax, which then cools and hardens on contact with the colder glass surface. Keeping the printheads at higher temperatures may have a negative impact on the lifetime of the printhead. Another disadvantage may be a poor stability of an inkjet ink comprising a wax.

In WO2013/189762 (AGC) the protective layer is provided by an inkjet method using a UV curable fluid. The UV curable inkjet ink comprises N-vinyl-caprolactam, an acrylate monomer, a photoinitiator and a glycol ether acrylate.

A problem with the removal of the protective layer is flake formation in the alkaline stripping bath. Stripping solutions are normally solutions of alkaline metal hydroxides such as sodium or potassium hydroxide, or based on amines such as mono or tri ethanolamine and tetra methyl ammonium hydroxide. The stripping solution breaks the polymer chain at the cross-linking point of the three dimensional structure, which is formed during the polymerization of the resist and before the bond between the resist and the glass surface is broken. In order to extend the working lifetime of the stripping solution, it is necessary to filter the solution to remove the stripped flake of resist. If the flake size is too large it tends to adhere to stripping equipment disturbing the smooth running of the manufacturing process. If the flakes are too small they pass through the filter and return in the stripping bath. After a while these small flakes accumulate and also start to disturb the smooth running of the manufacturing process. These very small flakes tend to block the nozzles of the sprays of the stripping line.

The flakes may also redeposit on the etched glass surface and for example become stuck in the etched patterns, necessitating an additional cleaning step.

The stripped flake size depends mainly on the type of stripping solution, the concentration of the stripping solution, the temperature of the stripping solution and the design of the stripping equipment, etc. This multitude of influencing factors makes it very difficult to control the flake size to a desired size.

Hence, there remains a need for improved low viscous radiation curable inkjet inks suitable for reliable inkjet printing in an industrial etching process applicable to a wide range of etchants and etching conditions and exhibiting no problems with stripping and flake formation.

SUMMARY OF THE INVENTION

Preferred embodiments of the present invention provide an improved manufacturing method of a selectively etched glass article to overcome the above mentioned problems.

The advantages and benefits of the preferred embodiments of the present invention are realized by the manufacturing method described below. The above mentioned flake size problem has been solved by fully solubilising the protective layer.

Further advantages and embodiments of the present invention will become apparent from the following description.

DETAILED DESCRIPTION OF THE PREFERRED EMBODIMENTS

Definitions

Figure 1:
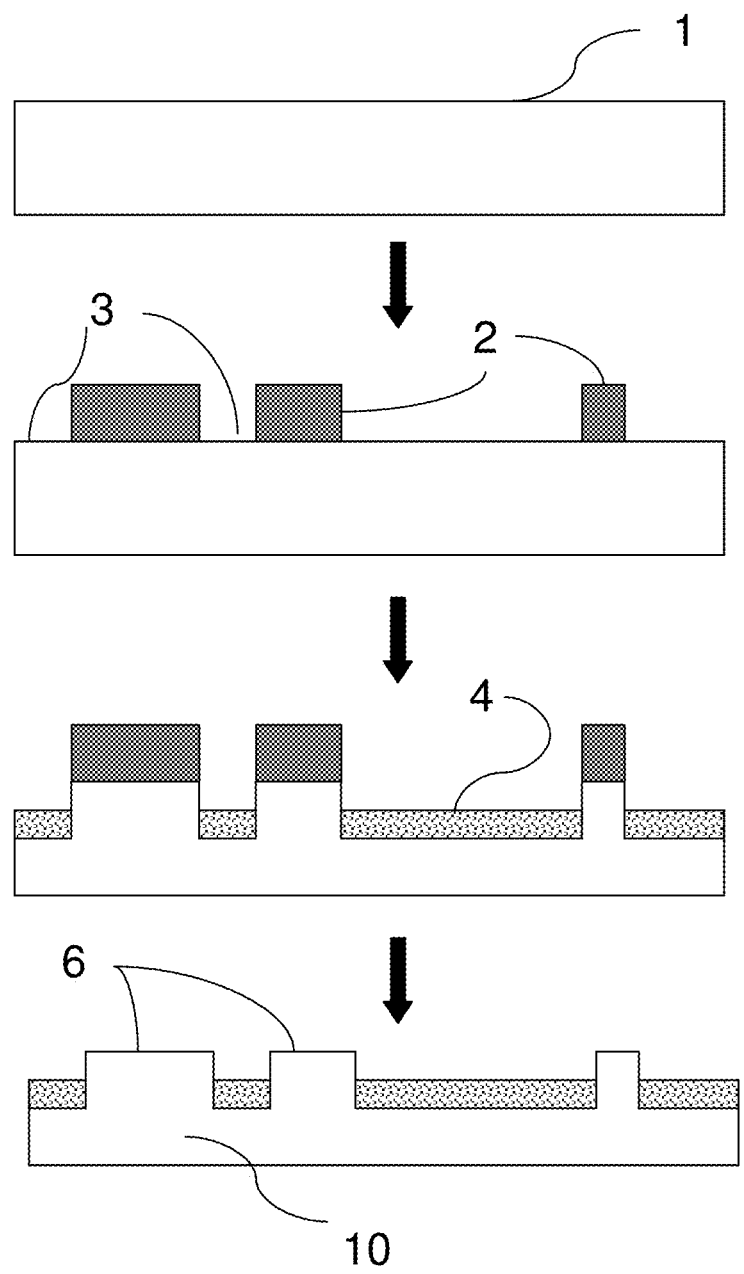
FIG. 1 illustrates a preferred embodiment for manufacturing an etched glass article. First, a UV cured image (2) is printed on a glass surface (1). Then, during an etching step, glass is etched away in those areas which are not protected by the UV cured image (3) while the glass surface protected by the UV cured image remains substantially intact. After removal of the UV cured image an etched glass article (10) is obtained comprising etched areas (4) and smooth areas (6).
Figure 2:
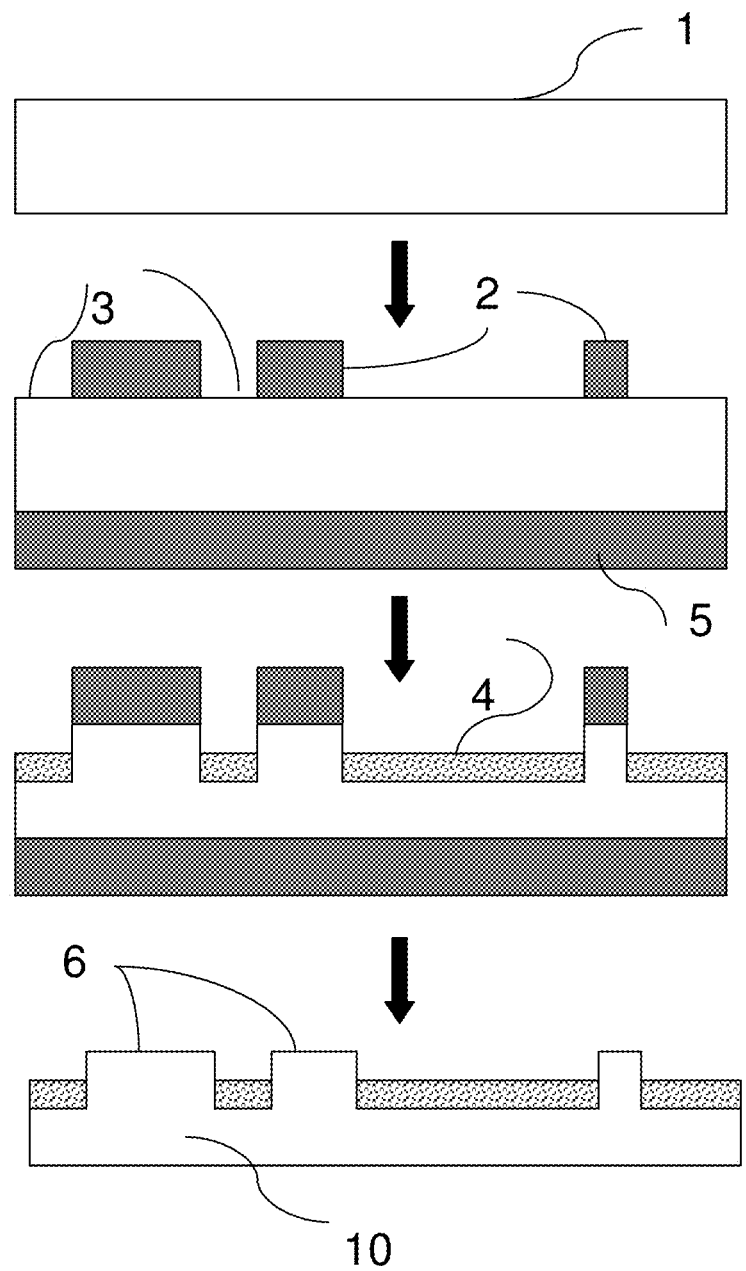
FIG. 2 illustrates another embodiment for manufacturing an etched glass article wherein a second surface of the glass sheet is completely covered by a UV cured layer (5) to protect that surface from the etching solution.

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —$NO_2$.

In the invention, etching of the glass is understood to mean the removal of a certain amount of material at the surface of the glass, giving a translucent/scattering aspect to the glass, a specific texture and sometimes roughness. The term "chemical etching" is used when the removal of material is carried out by chemical attack/reaction.

Manufacturing Method of Selectively Etching a Glass Article

The method of manufacturing an etched glass article (10) according to a preferred embodiment of the invention includes the steps of:

a) jetting an image (2) with a UV curable inkjet ink on a surface (1) of a glass article; b) UV curing the image (2); c) etching the surface not covered by the UV cured image (3) to obtain an etched image (4); and d) solubilising the UV cured image (2) in an aqueous alkaline solution.

Preferably, the UV cured image is solubilised within 15 minutes, more preferably within 10 minutes, most preferably within 5 minutes.

In a preferred embodiment, the glass surface is cleaned before printing the UV curable inkjet ink. This is especially desirable when the glass surface is handled by hand and no gloves are worn. The cleaning removes dust particles and grease which can interfere in the adhesion of the UV curable inkjet ink to the glass surface.

In preferred embodiment of the method, UV curing in step b) is carried out with UV LEDs.

The time between jetting and curing the image is preferably at least 50 ms, more preferably at least 75 ms, most preferably at least 100 ms.

It has been observed that clogging of the nozzles of the inkjet printheads may be prevented when the time between jetting and curing is as described above.

In a preferred embodiment, the time between jetting and curing the image is less than 750 ms, more preferably less than 600 ms, most preferably less than 500 ms.

It has been observed that the resolution of the image may decrease when the time between jetting and curing becomes too high, due to spreading of the inkjet ink on the glass surface between jetting and curing the inkjet ink.

In another preferred embodiment of the method the UV cured image is preferably given a heat treatment, preferably 10 to 45 minutes at 130 to 170° C., more preferably 20 to 30 minutes at 150° C., before etching, preferably between the UV curing step b) and the etching step c).

Suitable heating devices include devices circulating hot air, ovens, and infrared radiation sources.

The heating device may be, at least in part, arranged in combination with the print head of the inkjet printer, travelling therewith so that the radiation is applied very shortly after jetting. In such a case, the inkjet printer is preferably equipped with some kind of infrared radiation source, e.g. an infrared light source, such as infrared laser diodes or infrared LEDs.

A preferred effective infrared radiation source has an emission maximum between 0.8 and 1.5 µm. Such an infrared radiation source is sometimes called a NIR radiation source or NIR dryer. In a preferred form the NIR radiation source is in the form of NIR LEDs, which can be mounted easily on a shuttling system of a plurality of inkjet print heads in a multi-pass inkjet printing device.

NIR-radiation energy quickly enters into the depth of the inkjet ink layer and removes water and solvents out of the whole layer thickness, while conventional infrared and thermo-air energy is predominantly absorbed at the surface and is then slowly conducted into the ink layer, which results usually in a slower removal of water and solvents.

The jetting step (a) and the UV curing step (b) may be repeated two, three, four or more times before the etching step c) to obtain a sufficiently thick and etch resistant UV cured image. Alternatively, the jetting step (a) is repeated two, three, four or more times before the curing step (b), also to obtain a sufficiently thick and etch resistant UV cured image.

The etching step (c) may also be repeated two, three or more times to obtain a sufficiently etch depth.

According to another embodiment of the method, a UV curable inkjet ink containing a colorant is jetted on at least part of the etched image. Adding colours to at least part of the etched image may further increase the decorative value of the image. Preferably, a white base layer is first applied to the area where colours will be printed.

The UV cured image is stripped from the glass surface and dissolved in the alkaline stripping solution. This stripping method avoids problems of clogging of filters by UV cured image flakes.

The etched glass article (10) obtained with the method according to the invention thus comprises (i) regions which are etched (4), corresponding to the regions which were not covered beforehand by the UV cured image (3), that is to say corresponding to the "negative" of the UV cured image, and (ii) smooth regions (6), corresponding to the regions which were covered by the UV cured image ((2).

The desired pattern(s) on the glass articles may be formed by the etched regions (4) or alternatively by the smooth regions (6).

The pattern can be a logo, characters, texts, a drawing, and the like. The glass article manufactured by the method according to the invention may comprise just one pattern or, alternatively, several identical or different patterns distributed over the glass article.

An etched glass is normally characterized by its roughness and in particular by the Rz (Mean Roughness Depth) and Rsm (Mean width of profile elements) parameters (expressed in µm) and the ratio Rz/Rsm between these two parameters. According to one embodiment, the etched regions (4) of the glass article obtained according to the method of the invention exhibit a preferred surface roughness defined by a Rz value of greater than 9 µm and less than 22 µm and an Rz/Rsm ratio of greater than 0.12 and less than 0.30.

Depending on the roughness obtained, the selectively etched glass sheet can have different applications. For example, it can be used for decorative applications or, if the roughness obtained is high, for applications as non-slip flooring, floor or staircase step.

Glass Substrates

The glass article is made of glass which may belong to various categories.

The glass can thus be a glass of soda-lime-silica type, a borate glass, a lead glass, a glass comprising one or more additives homogeneously distributed in its body, such as, for example, an inorganic colorant, an oxidizing compound, a viscosity-regulating agent and/or an agent which facilitates melting.

Preferably, the glass is of soda-lime-silica type.

The glass can be clear, extra-clear or coloured in its body.

A glass surface means planar as well as non-planar external surfaces of glass articles.

The manufacturing method according to the invention is preferably used for planar surfaces, especially for glass sheets.

Glass sheets can be a completely smooth glass sheets or an already etched glass sheet.

According to a preferred embodiment, the glass sheet is a float glass sheet. Highly preferred, the glass sheet is a float glass sheet of soda-lime-silica type.

The glass sheet can have any thickness. The thickness preferably ranges from 0.7 to 20 mm.

The manufacturing method according to the invention is particularly well-suited to selectively etch large surface areas of glass, for example glass sheets of which the surface area is at least 5 $m^2$.

However, the method may also be used to selectively etch smaller surface areas, for example surface areas of the order of 0.5 $m^2$.

The glass sheet may be thermally or chemically tempered, annealed or hardened.

In order to observe certain safety standards, the glass sheet may be laminated, i.e. it is rolled with another glass sheet by means of a thermoplastic film.

In the method according to the invention, one surface or both surfaces of a glass sheet may be selectively etched to form a pattern on one or both surfaces of the glass sheet.

Preferably, a pattern is formed on one surface of a glass sheet. When etching is carried out by dipping the glass sheet in an etch solution, one surface of the glass sheet is completely covered by a protective layer to protect that surface from the etch solution. Such a protective layer may be applied on the glass surface by any suitable application method, however it is preferred that such a protective layer is also applied by jetting and curing the UV curable inkjet ink used to form the image on the other surface of the glass sheet.

Etching

The etching solution used in the etching step of the method according to the invention is preferably an aqueous solution of hydrofluoric acid.

Typically, the etching solution has a pH between 0 and 5.

The acidic etching solution may further comprise, in addition to the hydrofluoric acid itself, salts of this acid, other acids, such as HCl, $H_2SO_4$, $HNO_3$, acetic acid, phosphoric acid and/or their salts (for example, $Na_2SO_4$, $K_2SO_4$, $(NH_4)_2SO_4$, $BaSO_4$, and the like), and optional adjuvants (e.g. acid/base buffer compounds, or compounds facilitating spreading of the solution) in minor proportions.

Alkaline salts and ammonium salts are preferred such as for example sodium, potassium and ammonium hydrofluoride or bifluoride.

The etching time, i.e. the time the glass plate is immersed in the etching solution, may vary as function of the etching solution used and of the amount of glass that has to be removed.

For reasons of productivity, the etching is preferably performed in a time frame of less than an hour, preferably in a time frame of 5 to 45 minutes, more preferably 10 to 30 minutes.

An increase in temperature generally accelerates the etching. Etching is preferably performed at a temperature between 20 and 50° C., more preferably at room temperature.

Etching maybe performed by spraying, preferably at a pressure of at least 1 bar, more preferably 1 to 2 bar.

In a preferred embodiment, etching is performed by dipping the glass sheet containing the UV cured image in an etch solution. For example, the glass sheet may be conveyed with a certain speed through a dipping tank containing an etching solution.

Etching may be performed in one step or in two, three, or more etching steps.

When multiple etching steps are used, all etching steps may have the same operating conditions, i.e. the same etching solution, etching time and etching temperature) or the etching steps may have different operating conditions.

Etching is preferably followed by rinsing with water to remove any residual etchant.

Before etching, the UV curable inkjet printed image is preferably given a heat treatment, preferably 10 to 45 minutes at 130 to 170° C., more preferably 20 to 30 minutes at 150° C.

Etching is preferably followed by rinsing with water to remove any residual etchant.

After etching, the UV cured image is preferably removed in an alkaline stripping solution. Such an alkaline stripping solution is usually an aqueous solution with a pH>10.

Stripping

The stripping solution or stripping bath is preferably an alkaline solution containing soda, potassium carbonate, alkaline metal hydroxides, such as sodium or potassium hydroxide, or is based on amines such as mono or tri ethanolamine and tetra methyl ammonium hydroxide. A preferred stripping solution contains at least 2 wt % of sodium or potassium hydroxide. The stripping solution in use preferably has a temperature between 30° C. and 85° C., more preferably 40° C. to 55° C. The stripping solution is preferably substantially free of organic solvent and most preferably contains no organic solvent.

In a preferred embodiment, spraying is used to apply the stripping solution. Implementing pressure by using spraying during stripping will increase the stripping speed and improves the degradation speed of the flakes.

The equipment for performing the etching and the stripping is dependent on the application and the dimensions of the glass substrate/article.

An etch bath may be used through which the glass substrate carrying the cured UV cured image(s) is transported at a controlled speed. A simple bath for etching wherein the glass substrate is submersed in the etchant liquid for a certain time and heated at a certain temperature is the most straight forward concept of a suitable apparatus.

UV Curable Inkjet Inks

A UV curable inkjet ink is printed on the glass surface and UV cured to form a UV cured image that protects the glass surface from the etching solution.

The UV curable inkjet ink may be cationically curable, but is preferably a free radical UV curable inkjet ink. The UV curable inkjet ink can be cured by e-beam, but is preferably cured by UV light, more preferably by UV light from UV LEDs.

For reliable industrial inkjet printing, the viscosity of the UV curable inkjet inks is preferably no more than 20 mPa·s at 45° C., more preferably between 1 and 18 mPa·s at 45° C., and most preferably between 4 and 14 mPa·s at 45° C.

For good image quality and adhesion, the surface tension of the UV curable inkjet inks is preferably in the range of 18 mN/m to 70 mN/m at 25° C., more preferably in the range of about 20 mN/m to about 40 mN/m at 25° C.

The UV curable inkjet ink used to form the UV cured image is solubilised by the stripping solution, meaning that no flakes are formed in the stripping solution.

The UV curable inkjet ink preferably contains a) one or more photoinitiators; b) optionally a colorant preferably decolorizing at a pH of more than 10; c) one or more hydrolyzable polyfunctional monomer or oligomer having at least one alkali hydrolyzable group located in the atomic chain between two polymerizable groups of the polyfunctional monomer or oligomer; and d) one or more water absorption controlling monomers being a monofunctional or difunctional monomer containing at least one functional group selected from the group consisting of a hydroxyl group, an ethylene oxide or oligo-ethylene oxide group, a tertiary amine group, an acidic group having a $pK_a$ not lower than 3 and a five to seven membered aromatic or non aromatic heterocyclic group.

The hydrolyzable polyfunctional monomers or oligomers are responsible for the degradation of the cured inkjet ink image in the stripping solution resulting in the cured inkjet ink image being completely dissolved in the stripping solution. However, in order to obtain acceptable manufacturing times, a second monomer needs to be included. The water absorption controlling monomers are responsible for the swelling of the cured ink image in the stripping solution. This accelerates the dissolving of the cured ink image by the alkali present in the stripping solution.

Hydrolyzable Polyfunctional Monomers or Oligomers

The UV curable inkjet ink preferably includes one or more hydrolyzable polyfunctional monomers or oligomers having at least one alkali hydrolyzable group located in the atomic chain between two polymerizable groups of the polyfunctional monomer or oligomer.

In a preferred embodiment, the at least one alkali hydrolyzable group located in the atomic chain between two polymerizable groups of the polyfunctional monomer or oligomer is selected from the group consisting of Formulae H-1 to H-4:

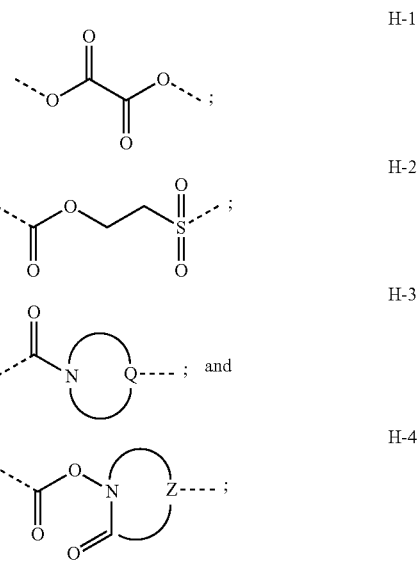

wherein
Q represents the necessary atoms to form a five membered aromatic ring group; Z represents the necessary atoms to form a five or six membered ring group; and the dashed lines represents the bonds to the rest of the polyfunctional monomer or oligomer.

In a further preferred embodiment, the at least one alkali hydrolyzable group H-3 is selected from the group consisting of an imidazole group, a benzimidazole group, a triazole group and a benzotriazole group.

In a further preferred embodiment, the at least one alkali hydrolyzable group H-4 is selected from the group consisting of a succinimide group and a phthalimide group.

In a particularly preferred embodiment, the at least one alkaline hydrolyzable group is an oxalate ester group.

The one or more hydrolyzable polyfunctional monomers or oligomers preferably contain polymerizable groups independently selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group.

Typical examples of hydrolyzable polyfunctional monomers and oligomers having at least one alkali hydrolyzable group located in the atomic chain between two polymerizable groups of the polyfunctional monomers and oligomers are given in Table 1 without being limited thereto.

TABLE 1

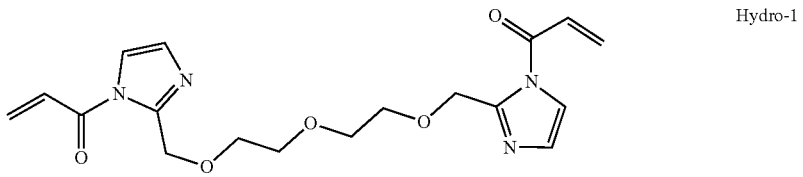

Hydro-1

TABLE 1-continued

| | |
|---|---|
| (structure) | Hydro-2 |
| (structure) | Hydro-3 |
| (structure) | Hydro-4 |
| (structure) | Hydro-5 |
| (structure) | Hydro-6 |
| (structure) | Hydro-7 |
| (structure) | Hydro-8 |
| (structure) | Hydro-9 |
| (structure) | Hydro-10 |
| (structure) | Hydro-11 |

The one or more hydrolyzable polyfunctional monomers or oligomers having at least one alkali hydrolyzable group located in the atomic chain between two polymerizable groups of the polyfunctional monomer or oligomer is preferably present in the UV curable inkjet ink in an amount of at least 25 wt %, more preferably in an amount of at least 30 wt % based on the total weight of the UV curable inkjet ink.

Water Absorption Controlling Monomers

The UV curable inkjet ink preferably contains one or more water absorption controlling monomers. A water absorption controlling monomer is a monofunctional or difunctional monomer containing at least one functional group selected from the group consisting of a hydroxyl group, an ethylene oxide or oligo-ethylene oxide group, a tertiary amine, an acidic function having a $pK_a$ not lower then 3 and a five to seven membered aromatic or non aromatic hetero-ring.

In a preferred embodiment, the one or more water absorption controlling monomers contain at least one functional group selected from the group consisting of a hydroxyl group an ethylene oxide or oligo-ethylene oxide group, a carboxylic acid group, a phenolic group, five to seven membered lactam group and a morpholino group.

In the most preferred embodiment, the one or more water absorption controlling monomers contain at least one functional group selected from the group consisting of an ethylene oxide or oligo-ethylene oxide group, a hydroxyl group and a morpholino group.

The water absorption controlling monomer is preferably a monofunctional monomer.

The one or more water absorption controlling monomers preferably include a polymerizable group selected from the group consisting of an acrylate group, a methacrylate group, a acrylamide group and a methacrylamide group, The one or more water absorption controlling monomers preferably include a polymerizable group selected from the group consisting of an acrylate group and an acrylamide group.

Suitable water absorption controlling monomers are given in Table 2, without being limited thereto.

TABLE 2

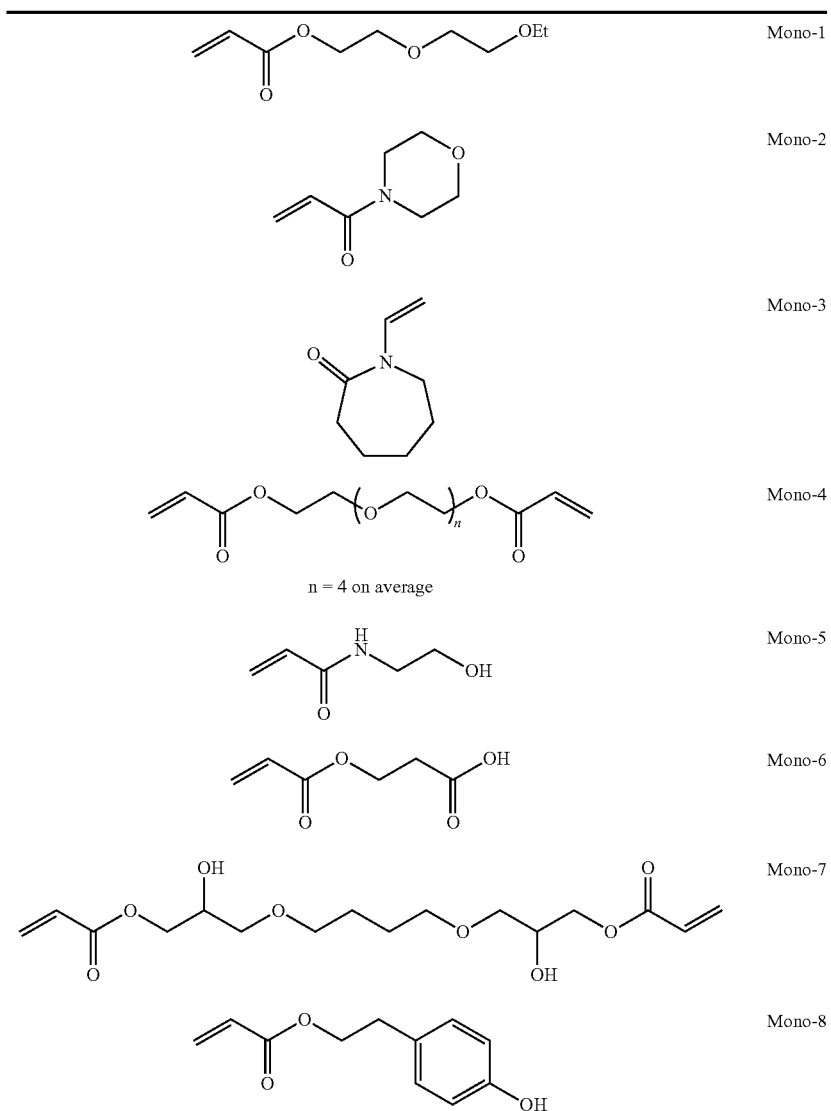

TABLE 2-continued

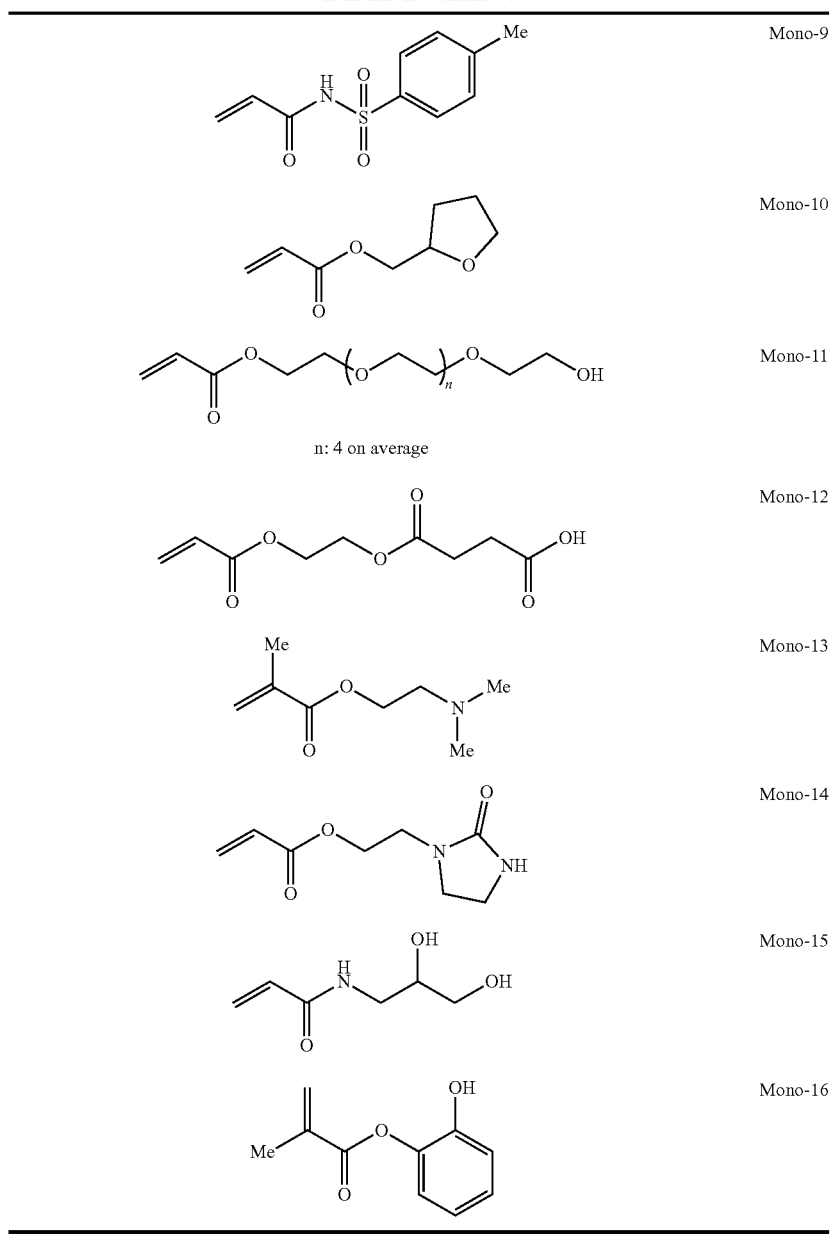

The one or more water absorption controlling monomers is preferably present in the UV curable inkjet ink in an amount of at least 20 wt % based on the total weight of the UV curable inkjet ink.

Other Polymerizable Compounds

The solubilizable UV curable inkjet ink may also contain one or more other monomers and oligomers next to the one or more hydrolyzable polyfunctional monomers and oligomers and the one or more water absorption controlling monomers, but preferably the UV curable inkjet ink consists of one or more hydrolyzable polyfunctional monomers and oligomers and one or more water absorption controlling monomers.

The solubilizable UV curable inkjet ink may contain one or more other monomers and oligomers, preferably present in the UV curable inkjet ink in an amount of no more than 25 wt %, more preferably no more than 15 wt % and most preferably in an mount of 0 to 10 wt % based on the total weight of the UV curable inkjet ink.

The other polymerizable compounds of the above described UV curable inkjet inks may be monomers and oligomers may possess different degrees of functionality, and a mixture including combinations of mono-, di-, tri- and higher functionality monomers, oligomers and/or prepolymers may be used. The viscosity of the UV curable inkjet ink can be adjusted by varying the ratio between the monomers and oligomers.

Particularly preferred other monomers and oligomers are those listed in [0106] to [0155] in EP-A 1911814.

Colorants

The UV curable inkjet may be a substantially colourless inkjet ink, but preferably the UV curable inkjet ink includes at least one colorant. The colorant makes the temporary mask clearly visible to the manufacturer of the glass article, allowing a visual inspection of quality.

The colorant may be a pigment or a dye, but is preferably a dye that is not bleached by the UV curing step during the inkjet printing process of the UV curable inkjet ink. Generally dyes exhibit a higher light fading than pigments, but cause no problems on jettability. However, most preferably the colorant is a dye that survives the UV curing step in the inkjet printing process. A dye causes unlike pigments and dispersants usually no sludge in the etching and stripping solutions.

It was found that anthraquinone dyes exhibit only minor light fading under the normal UV curing conditions used in UV curable inkjet printing.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548.

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

In a particularly preferred embodiment, the colorant in the UV curable inkjet ink is an anthraquinone dye, such as Macrolex™ Blue 3R (CASRN 325781-98-4) from LANXESS.

Other preferred dyes include crystal violet and a copper phthalocyanine dye.

In a preferred embodiment, the colorant of the inkjet ink is a dye which decolorizes at a pH of more than 10.

In a preferred embodiment, the colorant is dissolved in the radiation curable inkjet ink, i.e. it is a dye. Compared to pigments, dyes allow much faster discolouration. They also do not cause problems of dispersion stability in the inkjet ink due to sedimentation.

In a first preferred embodiment the colorant is represented by the open form of a lactone based leuco dye. In a further preferred embodiment, the leuco dyes are leuco dyes according to Formula (I) to (VIII).

Formula (I)

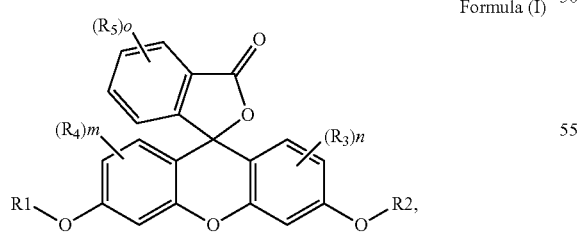

wherein $R^1$ and $R^2$ are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; n and m independently represent an integer from 0 to 3; $R^3$ and $R^4$ are independently selected from the group consisting of a substituted or unsubstituted alkyl group, an alkoxy group and a halogen; $R^5$ is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group, a halogen, an alkoxy group, an ester, an amide, an amine and a carboxylic acid; and o represents an integer from 0 to 4.

Formula (II)

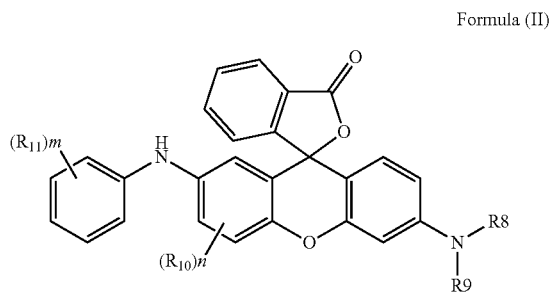

wherein R8 and R9 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R10 and R11 are independently selected from a substituted or unsubstituted alkyl group, a substituted or unsubstituted alkenyl group and a substituted or unsubstituted alkynyl group; n represents an integer from 0 to 3; and m represents an integer from 0 to 5.

Formula (III)

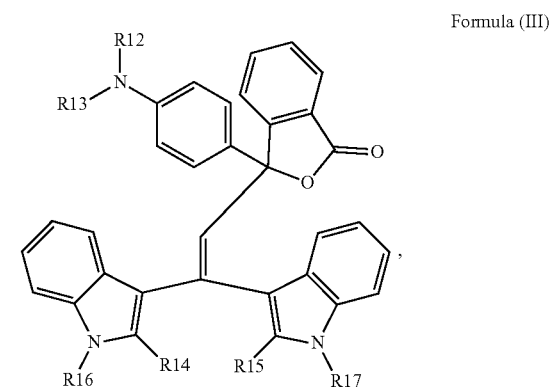

wherein R12, R13, R16 and R17 are independently selected from the group consisting of a substituted or unsubstituted alkyl group, a substituted or unsubstituted alkenyl group, a substituted or unsubstituted alkynyl group, a substituted or unsubstituted alkaryl group and a substituted or unsubstituted aralkyl group and a substituted or unsubstituted aryl or heteroaryl group; R14 and R15 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

Formula (IV)

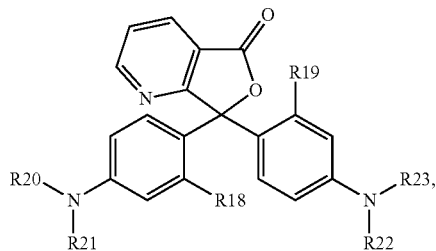

wherein R20 to R23 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R18 and R19 are independently selected from the group consisting of a hydrogen, a substituted or unsubstituted alkyl group and an alkoxy group.

Formula (V)

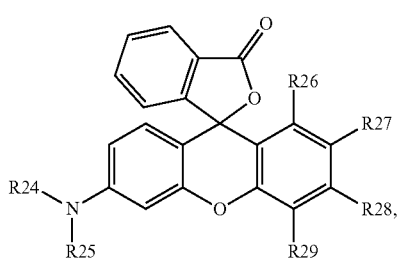

wherein R24 and R25 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R26 to R29 are independently selected from the group consisting of a hydrogen, a substituted or unsubstituted alkyl group and a group formed by two of the groups R26 to R29 forming a substituted or unsubstituted aromatic ring.

Formula (VII)

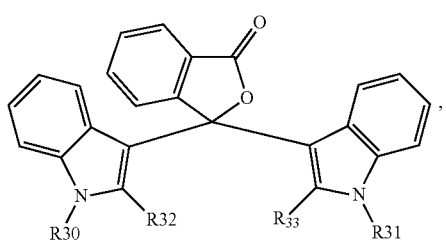

wherein R30 to R33 independently represent a group selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

Formula (VIII)

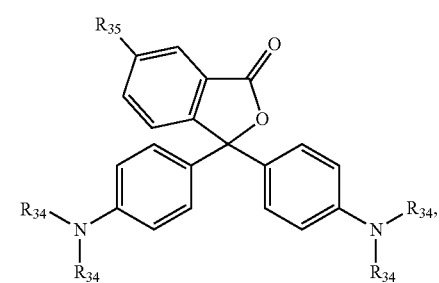

wherein R34 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R35 is selected from the group consisting of a hydrogen, an alkoxy group, a dialkylamino group, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

Typical examples of lactone based leuco dyes are given in Table 3 without being limited thereto.

TABLE 3

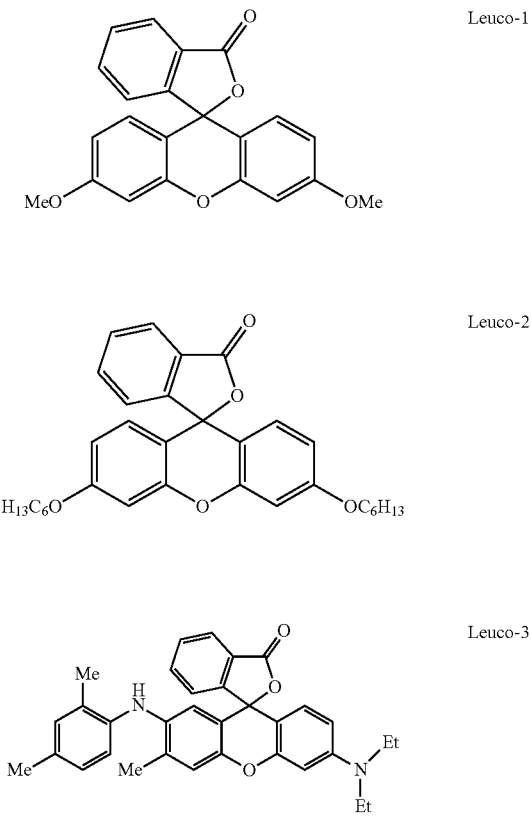

TABLE 3-continued

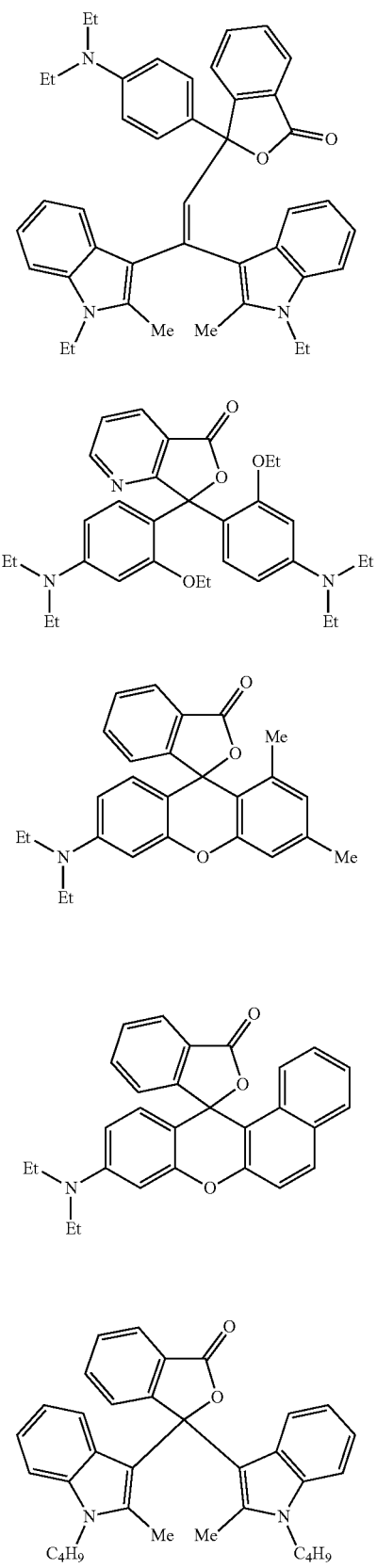

Leuco-4
Leuco-5
Leuco-6
Leuco-7
Leuco-8

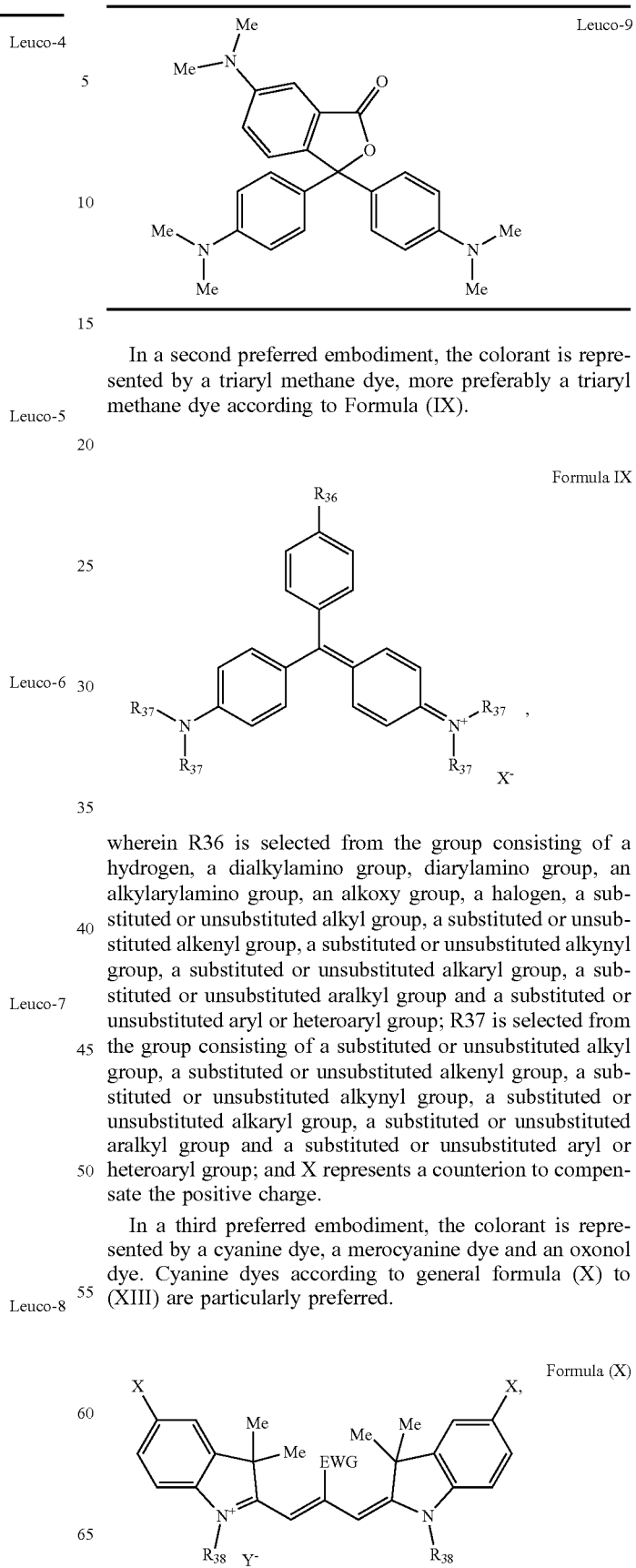

Leuco-9

In a second preferred embodiment, the colorant is represented by a triaryl methane dye, more preferably a triaryl methane dye according to Formula (IX).

Formula IX wherein R36 is selected from the group consisting of a hydrogen, a dialkylamino group, diarylamino group, an alkylarylamino group, an alkoxy group, a halogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R37 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; and X represents a counterion to compensate the positive charge.

In a third preferred embodiment, the colorant is represented by a cyanine dye, a merocyanine dye and an oxonol dye. Cyanine dyes according to general formula (X) to (XIII) are particularly preferred.

Formula (X)

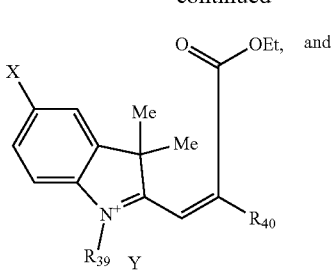

Formula (XI)

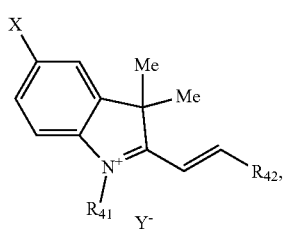

Formula (XII)

wherein X represents an group selected from a hydrogen, a nitrile, a nitro, a halogen and a sulfone; EWG represent an electron withdrawing group, preferably an ester group; R38, R39 and R41 independently represent a substituted or unsubstituted alky group; R40 and R42 are independently selected from the group consisting of a substituted or unsubstituted aryl group and a substituted or unsubstituted heteroaryl group; and Y represents a counterion to compensate the positive charge.

Other preferred colorants are represented by Formula (XIII) and (XIV):

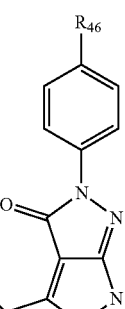

Formula (XIII)

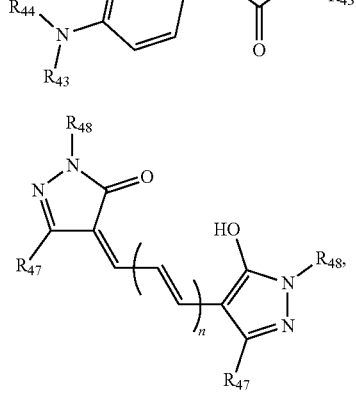

Formula (XIV)

wherein R43, R44 and R45 are independently selected from the group consisting of, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R46 is selected from the group consisting of a hydrogen, an alkoxy group, a halogen, a carboxy group or an ester thereof, a sulfonic acid or salt thereof, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R47 is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, an amino group, an amide group and a sulphonamide group; R48 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

In a particularly preferred embodiment, the colorant comprises at least on substituent, capable of compatibilizing the colorant or its decolorized form with an aqueous stripping solution. This substituent capable of compatibilizing said colorant or its decolorized form is preferably selected from the group consisting of a carboxylic acid or salt thereof, a sulfonic acid or salt thereof, a phosphonic acid or salt thereof, a half ester of sulphuric acid or salt thereof, a mono- or diester of phosphoric acid or salt thereof, a phenolic group, an ethylene oxide group and a hydroxyl group, a carboxylic acid, a hydroxyl group and an ethylene oxide group being particularly preferred.

Typical colorants according to Formula (IX) to (XIV) are given in Table 4 without being limited thereto.

TABLE 4

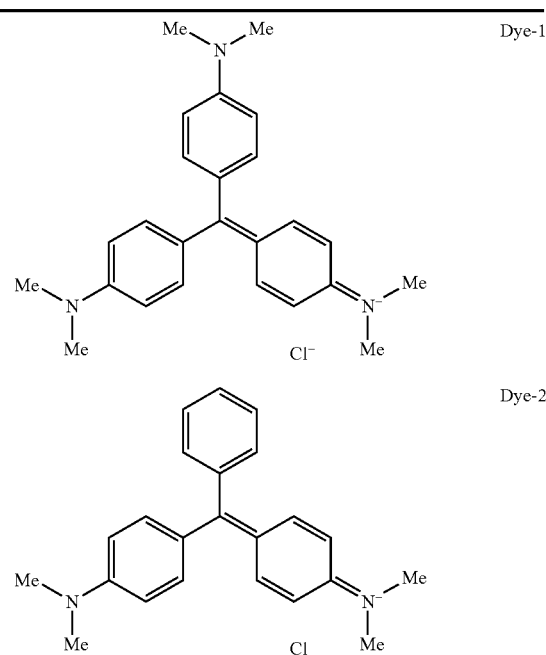

TABLE 4-continued

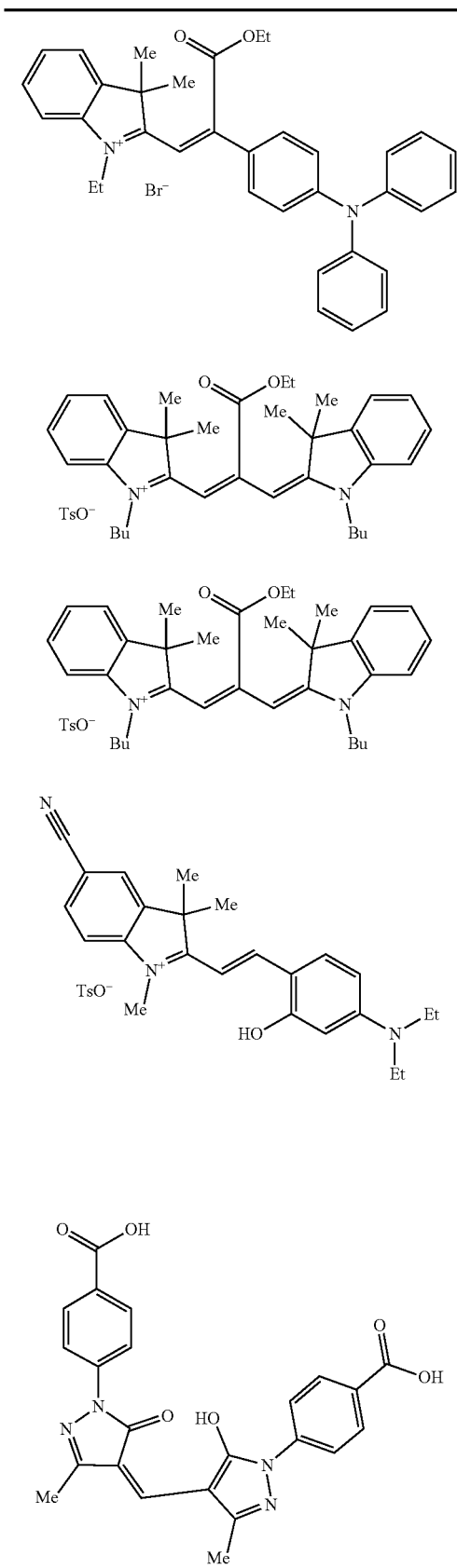

Dye-3

Dye-4

Dye-5

Dye-6

Dye-7

TABLE 4-continued

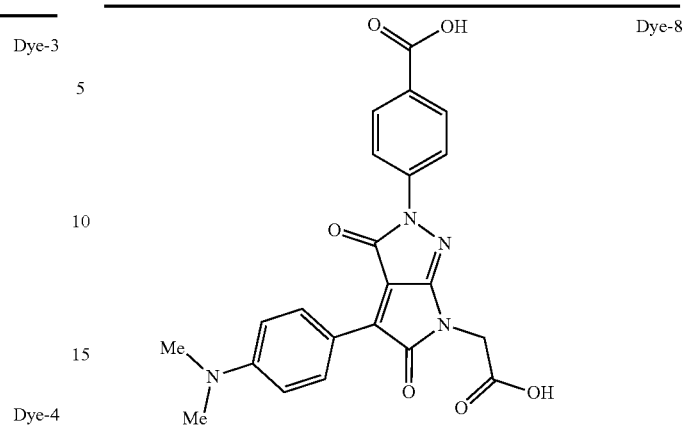

Dye-8

The colorant is present in the UV curable inkjet ink in an amount sufficient to impair visible colour to the cured ink pattern. In a preferred embodiment, the colorant is present in an amount of 0.1 to 6.0 wt %. For a dye, usually an amount of less than 2 wt %, more preferably less than 1 wt % based on the total weight of the UV curable inkjet ink suffices.

Photoinitiating System

The UV curable inkjet ink contains at least one photoinitiator, but may contain a photoinitiating system including a plurality of photoinitiators and/or co-initiators.

The photoinitiator in the UV curable inkjet ink is preferably a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

The photoinitiator may be a so-called diffusion hindered photoinitiator. A diffusion hindered photoinitiator is a photoinitiator which exhibits a much lower mobility in a cured ink layer than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator for the UV curable inkjet ink is preferably selected from the group consisting of non-polymeric multifunctional photoinitiators, oligomeric or polymeric photoinitiators and polymerizable photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP-A 2065362 in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the UV curable inkjet ink preferably also contains an initiator.

In order to increase the photosensitivity further, the UV curable inkjet ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylamino-benzoate, 2-n-butoxyethyl-4-(dimethylamino) benzoate, 2-(dimethylamino)-ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the UV curable inkjet ink, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

The UV curable inkjet ink preferably includes a polymerizable or polymeric tertiary amine co-initiator.

Preferred diffusion hindered co-initiators are the polymerizable co-initiators disclosed in EP-A 2053101 in paragraphs [0088] and [0097].

The UV curable inkjet inks preferably includes the (diffusion hindered) co-initiator in an amount of 0.1 to 50 wt %, more preferably in an amount of 0.5 to 25 wt %, most preferably in an amount of 1 to 15 wt % of the total weight of the UV curable inkjet ink.

Polymerization Inhibitors

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total weight of the UV curable inkjet ink.

Polymeric Dispersants

If the UV curable inkjet ink contains a colour pigment, then the UV curable inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP-A 1911814.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Surfactants

The UV curable inkjet ink may contain at least one surfactant, but preferably no surfactant is present. If no surfactant is present, the UV curable inkjet ink does not spread well on the glass surface allowing the generation of thin lines.

The surfactant can be anionic, cationic, non-ionic, or zwitter-ionic and is usually added in a total quantity less than 1 wt % based on the total weight of the UV curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoric surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferably the surfactant is present in the UV curable inkjet ink in an amount of 0 to 3 wt % based on the total weight of the UV curable inkjet ink.

Preparation of Inkjet Inks

The preparation of pigmented UV curable inkjet inks is well-known to the skilled person. Preferred methods of preparation are disclosed in paragraphs [0076] to [0085] of WO 2011/069943.

Inkjet Printing Devices

The UV curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the metal plate. In a single pass printing process the inkjet print heads usually remain stationary and the metal substrate is transported under the inkjet print heads.

For glass substrates which are not essentially two dimensional like a glass sheet, i.e. having a three dimensional shape like a sphere or more complex objects like a combination of a cylinder with a cube, the print head may be mounted on a robotic arm which is able to follow the shape of the three dimensional object to apply the UV curable inkjet ink. Such technology is known in the art, e.g. US2015042716, WO2014/001850 and US2015009254.

Suitable inkjet printers that may be used in the method according to the invention are for example the Anapurna M series printers available from Agfa Graphics.

Curing Devices

The UV curable inkjet ink can be cured by exposing them to actinic radiation, such as electron beam or ultraviolet radiation, preferably the image of UV curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the UV curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as ALDRICH CHEMICAL Co. (Belgium) and ACROS (Belgium) unless otherwise specified. The water used was deionized water.

ACMO is acryloyl morpholine available from RAHN.

INHIB is a mixture forming a polymerization inhibitor having a composition:

TABLE 5

| Component | wt % |
|---|---|
| DPGDA | 82.4 |
| p-methoxyphenol | 4.0 |

TABLE 5-continued

| Component | wt % |
|---|---|
| 2,6-di-tert-butyl-4-methylphenol | 10.0 |
| Cupferron™ AL | 3.6 |

Cupferron™ AL is aluminum N-nitrosophenylhydroxylamine from WAKO CHEMICALS LTD.

Dye-1 is a blue anthraquinone dye available as Macrolex™ Blue 3R from LANXESS.

ITX is an isomeric mixture of 2- and 4-isopropylthioxanthone available as Darocur™ ITX from BASF.

EPD is ethyl 4-dimethyaminobenzoate available as Genocure™ EPD from RAHN.

TPO is 2,4,6-trimethylbenzoyl-diphenyl-phosphineoxide, a photoinitiator available as Darocur™ TPO from BASF.

IC907 is 2-methyl-1-[4-(methylthio)phenyl]-2-morpholino-propan-1-one, a photoinitiator available as Irgacure™ 907 from BASF.

IC819 is bis(2,4,6-trimethylbenzoyl)-phenylphosphineoxide, a photoinitiator available as Irgacure™ 819 from BASF.

VEEA or 2-(2-vinyloxy-ethoxy)-ethyl acrylate was supplied by Nippon Shokubai.

PETA is pentaerythritol tetraacylate available as SR295 from SARTOMER.

PEG200DA is polyethylene glycol (MW200) diacrylate available as Sartomer™ SR259 from SARTOMER having n=4:

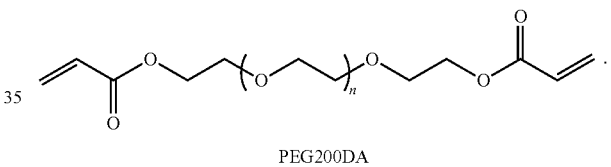

PEG200DA

HDDA is 1, 6-hexanediol diacrylate available as Sartomer™ SR238 from SARTOMER:

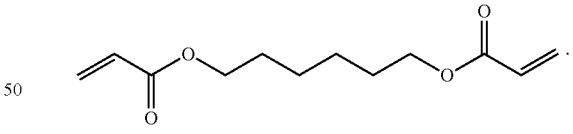

HDDA

HYDRO-8 is an oxalate monomer similar to PEG200DA:

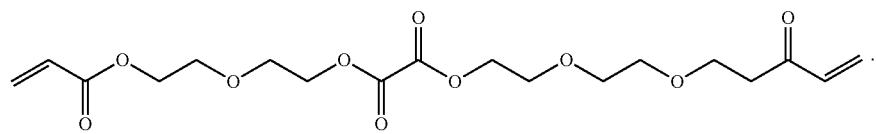

HYDRO-8

The synthesis of oxalic acid bis-[2-(2-acryloyloxy-ethoxy)-ethyl]ester (HYDRO-8) was performed as follows.

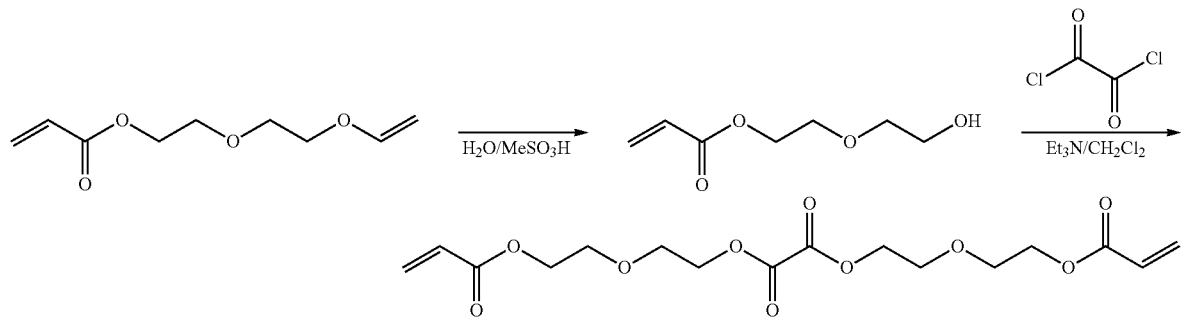

First Step: Synthesis of 2-(2-hydroxy-ethoxy)-ethyl acrylate 55.9 g (0.3 mol) 2-(2-vinyloxy-ethoxy)-ethyl acrylate was dissolved in 100 ml acetone. 27 g (1.5 mol) water and 0.6 g (6 mmol) methane sulfonic acid was added. The reaction was allowed to continue for 4 hours at room temperature. The reaction mixture was diluted with 500 ml methylene chloride and extracted with 250 ml water. The organic fraction was dried over MgSO4 and evaporated under reduced pressure. 2-(2-hydroxy-ethoxy)-ethyl acrylate was analyzed using TLC-chromatography (Partisil KC18F, supplied by Whatman, eluent: methanol/0.5 N NaCl 80/20, $R_f$: 0.83, only traces of (2-vinyloxy-ethoxy)-ethyl acrylate, $R_f$: 0.66 and a compound according to the following structure, $R_f$: 0.9).

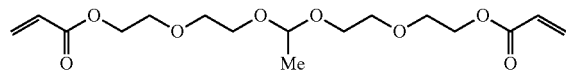 [SMILES: C=CC(=O)OCCOCCOC(C)OCCOCCOC(=O)C=C]

2-(2-hydroxy-ethoxy)-ethyl acrylate was used without further purification.

Second Step: Synthesis of oxalic acid bis-[2-(2-acryloyloxy-ethoxy)-ethyl]ester 30.4 g (0.19 mol) of 2-(2-hydroxy-ethoxy)-ethyl acrylate, 19.8 g (0.196 mol) triethyl amine and 1.3 g (5.7 mmol) BHT were dissolved in 140 ml methylene chloride. The solution was cooled to −10° C. A solution of 12.1 g (0.095 mol) oxalyl chloride in 70 ml methylene chloride was added drop wise, while maintaining the temperature at −10° C. The reaction was allowed to continue for 1 hour at 0° C., followed by reaction at room temperature for 16 hours. The reaction mixture was added to 200 g ice and the mixture was extracted with 200 ml methylene chloride. The organic fraction was extracted with 200 ml of a 1N hydrochloric acid solution, 200 ml of a saturated NaHCO₃ solution and 200 ml of brine. The organic fraction was dried over MgSO4 and evaporated under reduced pressure. The crude product was purified, using preparative column chromatography using a Prochrom LC80 column, packed with packed with Kromasil Si 60 å 10 μm and methylene chloride/ethyl acetate 90/10 as eluent. 19.1 g of oxalic acid bis-[2-(2-acryloyloxy-ethoxy)-ethyl]ester was isolated (y: 54%). The compound was analyzed using TLC-chromatography (TLC Silica gel 60 $F_{254}$, supplied by Merck, eluent: methylene chloride/ethyl acetate, 83/17, $R_f$: 0.42) and LC-MS, according to the method described below (retention time: 6.6 min, purity 96.2 area %).

HYDRO-11 is an oxalate monomer similar to HDDA:

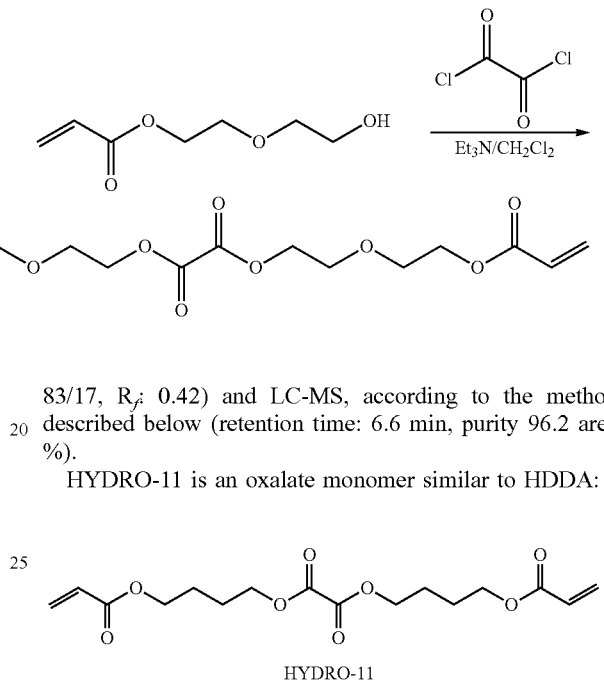

HYDRO-11

The synthesis of oxalic acid bis-(4-acryloyloxy-butyl) ester (HYDRO-11) was performed as follows.

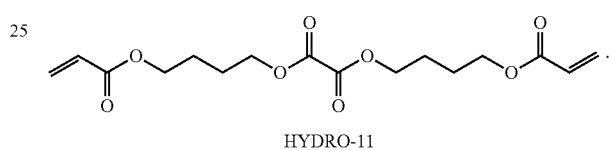

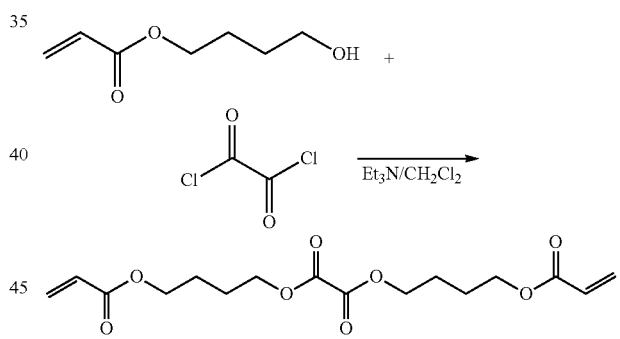

51.3 g (0.3 mol) 4-hydroxy-butyl acrylate, 31.4 g (0.31 mol) triethyl amine and 2 g (9 mmol) BHT were dissolved in 200 ml methylene chloride. The reaction mixture was cooled to −10° C. A solution of 19.0 g (0.15 mol) oxalyl chloride in 100 ml methylene chloride was added drop wise while maintaining the temperature at −10° C. The reaction was allowed to continue for 1 hour at 0° C., followed by reaction at room temperature for 16 hours. The reaction mixture was poured into 500 g ice and the mixture stirred for 1 hour. The mixture was extracted twice with 200 ml methylene chloride. The pooled organic fractions were extracted with 300 ml of a 1 N hydrochloric acid solution, 300 ml of a saturated NaHCO₃ solution and twice with 200 ml of brine. The organic fraction was dried over MgSO₄ and evaporated under reduced pressure. The crude product was purified, using preparative column chromatography using a Prochrom LC80 column, packed with packed with Kromasil Si 60 å 10 μm and methylene chloride/ethyl acetate 90/10 as eluent. 22 g of oxalic acid bis-(4-acryloyloxy-butyl)ester was isolated (y: 43%). The compound was analyzed, using TLC chromatography (TLC Silica gel 60 $F_{254}$, supplied by Merck, eluent: methylene chloride/ethyl acetate 96/4, $R_f$: 0.3), GC (retention time: 12.2 min, purity: 99.6 area %), and GC-MS, both according to the method described below.

DPGDA is dipropylene glycol diacrylate available as Sartomer™ SR508 from SARTOMER.

NVL is n-vinylcaprolactam available from BASF.

PEA is phenoxy acrylate available as Sartomer™ SR339C from SARTOMER.

VEEA or 2-(2-vinyloxy-ethoxy)-ethyl acrylate was supplied by Nippon Shokubai.

Measurement Methods

1. Etch Resistance (ER)

The etch resistance was evaluated by controlling if the ink layer was still present after etching and rinsing. Evaluation was made in accordance with a criterion described in Table 6.

TABLE 6

| Evaluation | Criterion |
| --- | --- |
| OK | Layer is still completely present |
| Not OK | Layer is (partly) removed |

2. Strippability (SB) and Flakes

The strippability (SB) was determined using the etched and dried samples by submitting them into a beaker containing a 2% NaOH-solution at 50° C. while stirring. The time of release of the inkjetted layer from the glass surface, i.e. the release time, was measured.

The time of release of the UV curable inkjet printed layer from the metal surface, i.e. the release time, was measured. Evaluation was made in accordance with a criterion described in Table 7.

TABLE 7

| Evaluation | Criterion |
| --- | --- |
| OK | Release time of less than 5 minutes |
| Moderate | Release time of 5 to 10 minutes |
| Not OK | Release time of more than 10 minutes |

Once the release of the UV curable inkjet printed layer started, the formation of flakes was observed.

3. Viscosity

The viscosity of the formulations was measured at 45° C. using a "Robotic Viscometer Type VISCObot" from CAMBRIDGE APPLIED SYSTEMS.

Example 1

This example illustrates UV curable inkjet ink printing, wherein after etching the UV cured image is stripped and solubilised. This avoids the necessity to filter out flakes of the cured ink image.

Preparation of the UV Curable Inkjet Inks

The UV curable inkjet ink C-1 to C-3 and I-1 to I-3 were prepared according to Table 8. The weight percentage (wt %) was based on the total weight of the UV curable inkjet ink. The UV curable inkjet ink C-1 lacks a hydrolyzable polyfunctional monomer or oligomer, while the UV curable inkjet ink C-2 lacks a water absorption controlling monomer. C-3 is the UV curable ink disclosed in WO2013/189762.

TABLE 8

| wt % of component: | C-1 | C-2 | C-3 | I-1 | I-2 | I-3 |
| --- | --- | --- | --- | --- | --- | --- |
| Dye-1 | 1.75 | 1.75 | 1.00 | 1.75 | 1.75 | 1.75 |
| ITX | 5.00 | 5.00 | 4.00 | 5.00 | 5.00 | 5.00 |
| IC907 | 5.00 | 5.00 | — | 5.00 | 5.00 | 5.00 |
| IC819 | 3.00 | 3.00 | — | 3.00 | 3.00 | 3.00 |
| TPO | 2.00 | 2.00 | 4.00 | 2.00 | 2.00 | 2.00 |
| EPD | — | — | 4.00 | — | — | — |
| INHIB | 1.00 | 1.00 | 1.00 | 1.00 | 1.00 | 1.00 |
| DPGDA | — | — | 56.00 | — | — | — |
| NVL | — | — | 15.00 | — | — | — |
| PEA | — | — | 15.00 | — | — | — |
| PEG200DA | 52.25 | — | — | — | — | — |
| HDDA | 30.00 | — | — | — | — | — |
| VEEA | — | — | — | — | — | 20.00 |
| PETA | — | — | — | — | 26.00 | — |
| ACMO | — | — | — | 52.25 | 26.25 | — |
| HYDRO-8 | — | 52.25 | — | — | — | 32.25 |
| HYDRO-11 | — | 30.00 | — | 30.00 | 30.00 | 30.00 |

Evaluation and Results

A glass plate was cleaned with a cotton pad dipped in isopropanol to remove dust and grease particles.

After drying an image was printed on the glass plate with the UV curable inkjet inks C-1, C-2 and I-1 to I-3 using an Anapurna Mw inkjet printer (available from Agfa Graphics NV) equipped with Konica Minolta 512M print heads at 14 pL drop volume in 8 passes (1440×1440 dpi). The image was then cured by means of a Hg lamp.

An additional heat treatment of 30 minutes at 150° C. was given to the cured image.

The glass plate was then immersed in an etching solution of which the composition is shown in Table 9 during 5 minutes at room temperature.

TABLE 9

| Ingredient | Amount (wt %) |
| --- | --- |
| Water | 25 |
| Ammonium hydrofluoride | 50 |
| Sulfuric acid (concentrated) | 6 |
| Hydrogen fluoride (50 wt % aqueous solution) | 6 |
| Potassium sulphate | 10 |
| Ammonium sulphate | 3 |

The glass plate was rinsed with water and dried.

An evaluation of the etch resistance was then made as shown in Table 10

The etched glass plate was subjected for 5 minutes at 50° C. to an alkaline strip bath (containing 2% NaOH), then rinsed for 90 seconds with water, dried, and evaluated for strippability and the shape of the stripped ink layer. The results are shown in Table 10.

TABLE 10

| UV Curable Inkjet Ink | Visco | Etch Resistance | Stripping (after 5 min) | |
| --- | --- | --- | --- | --- |
| | | | Strippability | Visual Shape |
| COMP-1 | 8.8 | NOK | OK | large flakes |
| COMP-2 | 8.5 | OK | OK | small flakes |
| COMP-3 | 5.5 | OK | OK | Full layer |

TABLE 10-continued

| UV Curable Inkjet Ink | Visco | Etch Resistance | Stripping (after 5 min) | |
|---|---|---|---|---|
| | | | Strippability | Visual Shape |
| INV-1 | 11.8 | OK | OK | fully dissolved |
| INV-2 | 12.7 | OK | OK | fully dissolved |
| INV-3 | 15.7 | OK | OK | almost fully dissolved |

From Table 10, it should be clear that the UV curable inkjet inks I-1 to I-3 provided results for etch resistance and strippability that are comparable to those of the comparative UV curable inkjet inks C-1 to C-3, with the exception that the cured ink pattern in the alkaline stripping bath fully dissolved into a blue colored liquid within 5 minutes.

It was found that by replacing the colorant Dye-1 by crystal violet that the colored cured ink image in the alkaline stripping bath fully dissolved into a colourless liquid within 5 minutes. By using crystal violet as a dye that decolorizes at a pH of more than 10, two advantageous effects were obtained. Firstly, the cured ink image could be visually inspected before etching. Secondly, when the stripping solution starts to get colored after multiple strippings, this forms an indication to replace the stripping solution.

The invention claimed is:

1. A method of manufacturing an etched glass article, the method comprising:
   jetting an image with a UV curable inkjet ink on a surface of a glass article, wherein the UV curable inkjet ink includes:
   a) one or more photoinitiators;
   b) one or more hydrolyzable polyfunctional monomers or oligomers having at least one alkali hydrolyzable group located in an atomic chain between two polymerizable groups of the polyfunctional monomer or oligomer; and
   c) one or more water absorption controlling monomers being a monofunctional or difunctional monomer containing at least one functional group selected from the group consisting of a hydroxyl group, an ethylene oxide or oligo-ethylene oxide group, a tertiary amine group, an acidic group having a pKa not lower than 3, and a five to seven membered aromatic or non-aromatic heterocyclic group;
   UV curing the image;
   etching a surface of the glass article not covered by the UV cured image to obtain an etched image; and
   solubilizing the UV cured image in an aqueous alkaline solution.

2. The method according to claim 1, wherein, during the step of solubilizing the UV cured image, the UV cured image is solubilized within 5 minutes.

3. The method according to claim 1, wherein the step of UV curing the image is performed with UV LEDs.

4. The method according to claim 1, wherein a time between the steps of jetting the image and UV curing the image is at least 50 ms.

5. The method according to claim 1, further comprising the step of:
   heating the UV cured image before the step of etching.

6. The method according to claim 1, wherein the glass article is a glass sheet.

7. The method according to claim 1, further comprising the step of:
   jetting a second UV curable inkjet ink including a colorant on at least a portion of the etched image.

8. The method according to claim 7, wherein the step of jetting the second UV curable inkjet ink is performed before the step of solubilizing the UV cured image.

9. The method according to claim 1, wherein the one or more water absorption controlling monomers include at least one functional group selected from the group consisting of an ethylene oxide or oligo-ethylene oxide group, a hydroxyl group, and a morpholino group.

10. The method according to claim 1 wherein the at least one alkali hydrolyzable group located in the atomic chain between two polymerizable groups of the one or more polyfunctional monomers or oligomers is selected from the group consisting of Formulae H-1 to H-4:

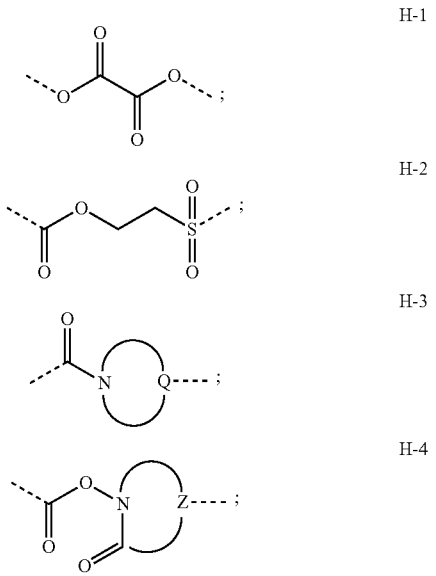

wherein

Q represents necessary atoms to form a five membered aromatic ring group;

Z represents necessary atoms to form a five or six membered ring group; and the dashed lines represent bonds to a remainder of the polyfunctional monomer or oligomer.

11. The method according to claim 9, wherein the at least one alkali hydrolyzable group located in the atomic chain between two polymerizable groups of the one or more polyfunctional monomers or oligomers is selected from the group consisting of Formulae H-1 to H-4:

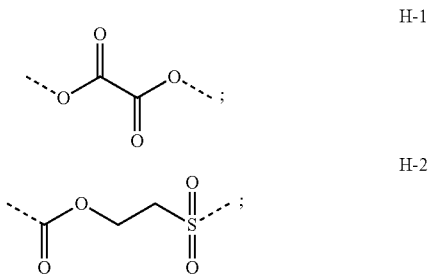

-continued

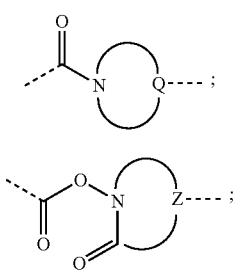

H-3

H-4 wherein

Q represents necessary atoms to form a five membered aromatic ring group;

Z represents necessary atoms to form a five or six membered ring group; and the dashed lines represent bonds to a remainder of the polyfunctional monomer or oligomer.

12. The method according to claim 11, wherein the at least one alkali hydrolyzable group H-3 is selected from the group consisting of an imidazole group, a benzimidazole group, a triazole group, and a benzotriazole group.

13. The method according to claim 11, wherein the at least one alkali hydrolyzable group H-4 is selected from the group consisting of a succinimide group and a phthalimide group.

14. The method according to claim 1, wherein the least one alkali hydrolyzable group located in the atomic chain between two polymerizable groups of the one or more hydrolyzable polyfunctional monomers or oligomers is an oxalate group.

15. The method according to claim 9, wherein the least one alkali hydrolyzable group located in the atomic chain between two polymerizable groups of the one or more hydrolyzable polyfunctional monomers or oligomers is an oxalate group.

16. The method according to claim 1 wherein the one or more hydrolyzable polyfunctional monomers or oligomers is a difunctional hydrolyzable polyfunctional monomer or oligomer.

17. The method according to claim 1, wherein the polymerizable groups of the polyfunctional monomer or oligomer are independently selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group, and an allyl ester group.

* * * * *